(12) United States Patent
Klinger

(10) Patent No.: US 6,376,803 B1
(45) Date of Patent: Apr. 23, 2002

(54) SERVING AND TRANSPORT RECEPTACLE

(75) Inventor: Gerald Klinger, Graz (AT)

(73) Assignee: THERMO VISION ENIWICKLINGS-UND HANDELS GmbH, Graz (AT)

( * ) Notice: Subject to any disclaimer, the term of this patent is extended or adjusted under 35 U.S.C. 154(b) by 0 days.

(21) Appl. No.: 09/763,601

(22) PCT Filed: Sep. 7, 1999

(86) PCT No.: PCT/AT99/00217

§ 371 Date: Feb. 23, 2001

§ 102(e) Date: Feb. 23, 2001

(87) PCT Pub. No.: WO00/15091

PCT Pub. Date: Mar. 23, 2000

(30) Foreign Application Priority Data

Sep. 10, 1998 (AT) ............................................. 598/98 U

(51) Int. Cl.⁷ ................................................. A47J 39/02
(52) U.S. Cl. ...................... 219/387; 219/403; 219/386; 99/483
(58) Field of Search ................................. 219/385–387, 219/392, 432, 433, 435, 436, 403; 99/483

(56) References Cited

U.S. PATENT DOCUMENTS

| | | | | |
|---|---|---|---|---|
| 3,751,629 A | * | 8/1973 | Eisler | 219/385 |
| 3,904,778 A | | 9/1975 | Shevlin | 426/418 |
| 3,908,749 A | * | 9/1975 | Williams | 219/386 |
| 4,093,041 A | * | 6/1978 | Davis et al. | 219/386 |
| 4,110,587 A | | 8/1978 | Souder, Jr. et al. | 219/10.49 R |
| 4,198,559 A | * | 4/1980 | Walter et al. | 219/387 |
| 4,491,233 A | | 1/1985 | Johnson | 220/23.83 |
| 4,560,859 A | | 12/1985 | Brennan | 219/386 |
| 5,274,215 A | * | 12/1993 | Jackson | 219/439 |
| 5,440,975 A | * | 8/1995 | Bean | 99/483 |
| 6,034,355 A | * | 3/2000 | Naderi et al. | 219/387 |

FOREIGN PATENT DOCUMENTS

| | | |
|---|---|---|
| DE | 4231341 | 1/1994 |
| DE | 19528973 | 2/1997 |
| WO | 9002509 | 3/1990 |

OTHER PUBLICATIONS

Partial English Translation of DE 4231341 dated Jan. 5, 1994.
Partial English Translation of DE 19528973 dated Feb. 13, 1997.
English Abstract of WO 90/02509 dated Mar. 22, 1990.

* cited by examiner

Primary Examiner—Joseph Pelham
(74) Attorney, Agent, or Firm—Ladas & Parry

(57) ABSTRACT

A serving and transport receptacle (1) for food dishes (2) filled with portioned meals, including a base part (16) which is made to be heat-insulating and provided with recesses (22) as well as means for heating the food dishes (2), and at least one hood-shaped cover part (36) which is made to be heat-insulating and capable of being positioned and coupled with the base part (16). An accommodation surface of the base part (16) includes at least one positioning means (18) rising above the accommodation surface and engaging in a positioning seat (13) provided in a surface (8) of a tray (3) containing the base part (16).

16 Claims, 3 Drawing Sheets

SERVING AND TRANSPORT RECEPTACLE

The PCT Application was published German.

The invention relates to a serving and transport receptacle as defined in the preamble of claim 1.

From DE 42 31 341 A1, a receptacle for holding at least one electrically heatable food dish is known, which comprises a lower part made of heat-insulating materials and including at least one recess for receiving a food dish, and an upper part which is combinable and interlockable with the lower part and also made of a heat-insulating material. The lower part including the recess is provided with electric connection means which are line-connected with contact pieces arranged within the recess, feeding electric energy to the heating element arranged on the lower side of the dish.

From DE 25 43 667 A1, a device for storing, cooling and-heating individual foodstuffs is known, which comprises a tray for holding containers filled with meals and a shelf for receiving at least one tray, the shelf including means for cooling and heating the containers and the heating means substantially contacting the bottom of the container to be heated, to which end the tray is provided with positioning means and openings for the containers. That device facultatively enables the cooling or heating of individual containers with the tray inserted in the shelf, as well as the serving of the meals for consumption upon extraction of the tray from the shelf along with the containers disposed on it. It is disadvantageous that serving must be effected directly from the shelf in order to avoid cooling of the heated meals, thus impeding mobility.

The subject matter of U.S. Pat. No. 3,877,603 A relates to a tray for simultaneously serving hot and cold meals, particularly in an aircraft. In order to reduce efforts by the service personnel, the tray is comprised of a rigid base having at least one recess for cold meals, cutlery and the like, and heat-resistant means to hold a plurality of containers for hot meals as well as at least one further recess provided in the base to accommodate the holding means and containers for hot meals. Advantageously, the holding means are in the form of an inner tray with a plurality of recesses provided in its upper surface to hold the hot food containers. Prior to serving, the hot meals arranged in the holding means are heated and then placed on the tray. The hot meals may have strongly cooled when they arrive at the end consumer. To avoid this, the hot meals are usually heated too much, which may involve changes in the taste.

It is the object of the invention to provide a serving and transport receptacle for meals portioned in food dishes, which ensures the safe transport of the containers while keeping the meals warm until immediately before their consumption.

This object of the invention is reached by the characterizing features of claim 1. Surprisingly, it offers the advantage that the supply of the meals may be effected in one serving procedure both for hot meals and for other meals not affected by the heating or warming procedure, thus enabling a more versatile menu composition and simpler transport and service procedure.

Another option is the configuration according to claim 2, which enables the functionally simple manufacturing of a serving and transport receptacle base part. Yet, the configuration according to claim 3 is also advantageous, enabling the safe and correct positioning of the base part relative to the tray of the serving and transport receptacle.

Yet, the configuration according to claim 4 is also advantageous, rendering feasible the application of the tray without the use of a base part while, nevertheless, ensuring the safe and correct positioning of a food dish on the tray.

According to an advantageous advancement as described in claim 5, the strongly variable equipment of the serving and transport receptacle with different food dishes adapted to the respective requirements is feasible.

Yet, the configuration according to claim 6 is advantageous, too, offering to the user simple handling when detaching the base part from the tray, but also a user-conforming position during the consumption of the meals directly from the dish arranged in the base part. The configuration according to claim 7 is another option, providing a compact transport unit.

According to an advantageous further development as described in claim 8, an additional storing surface for food dishes is provided such that further courses that need not be heated or kept warm can be served in one serving procedure.

An advantageous advancement is described by claim 9, which, taking into account the usual dimensions of the food dishes such as, e.g., different food dish diameters for main courses, side dishes etc., offers the optimum spacial shape for the base part and the cover part.

In this context, the configuration according to claim 10 is possible, enabling securing during transportion by the slip-safe positioning a food dish deposited on the tray outside the base part.

According to an advantageous further development as described in claim 11, additional structural components are saved and a cost-effective configuration of the serving and transportation receptacle is obtained. Also the configurations according to claims 12 and 13 are of advantage, enabling the individual adaptation to different supply systems.

According to the characteristic features of claim 14, the direct deposition of heated food dishes on table surfaces provided, for instance, with synthetic coverings is feasible without any adverse effects, thus enabling cost-effective series production and offering a high safety factor to the user.

Finally, the configuration according to claim 15 is advantageous to the extent that an efficient energy input and a high stability for a long service life at a low empty weight are reached.

For a better understanding of the invention, the latter will be explained in more detail by way of the exemplary embodiments illustrated in the Figures. Therein:

Figure 1:
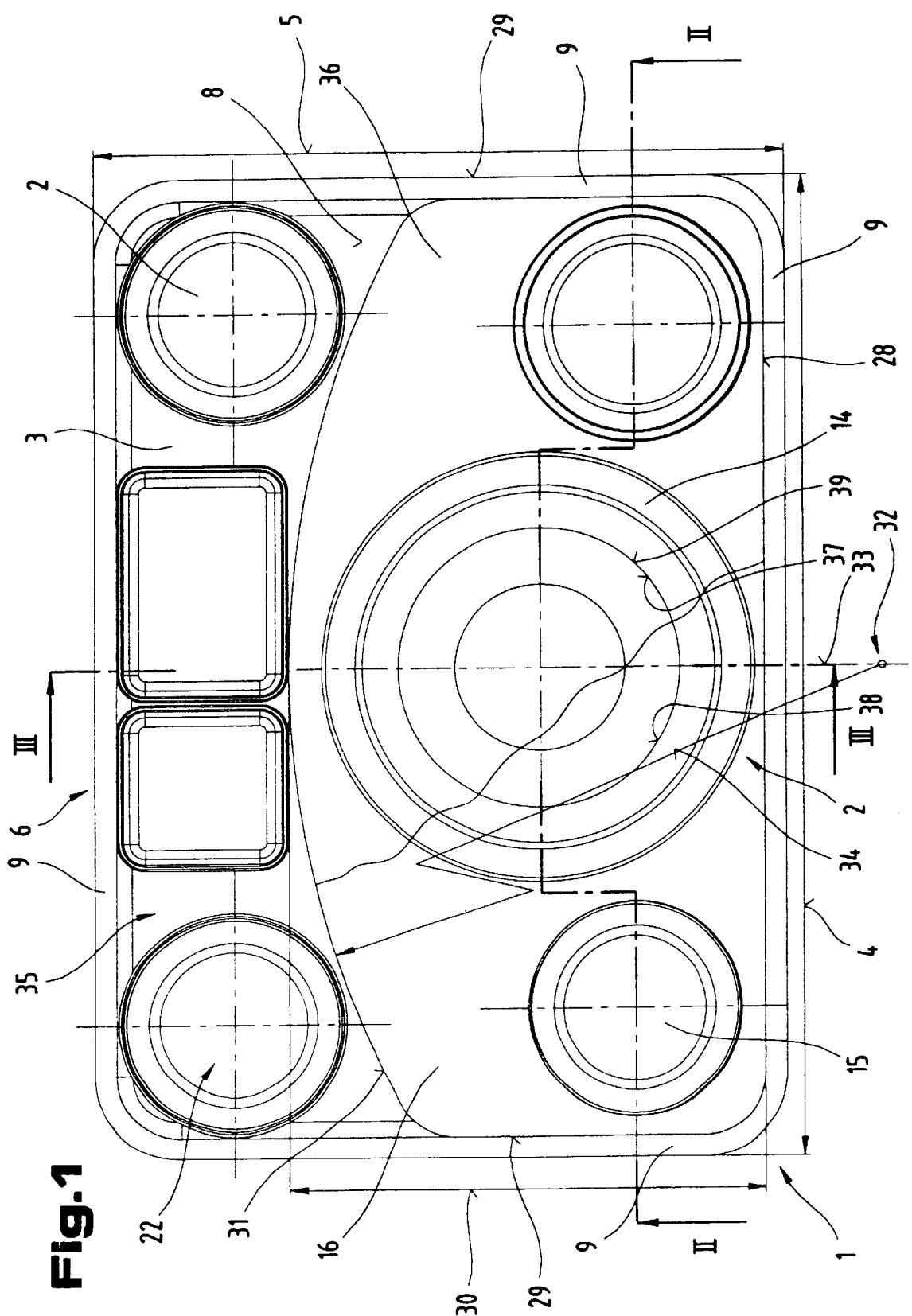
FIG. 1 depicts a serving and transport receptacle according to the invention in a partially sectioned top view.

To begin with, it should be noted that in the different embodiments described identical parts are provided with the same reference numerals and the same structural member designations, the disclosures contained in the whole description being analogously transferable to identical parts having the same reference numerals and structural member designations. Also the indications as to positions chosen in the description such as, e.g., up, down, lateral, etc. relate directly to the Figure described and illustrated and in the event of changes in position are to be analogously transferred to the new position. Furthermore, individual characteristic features or combinations of characteristic features of the different exemplary embodiments shown and described may constitute independent inventive solutions or independent solutions according to the invention.

Figure 2:
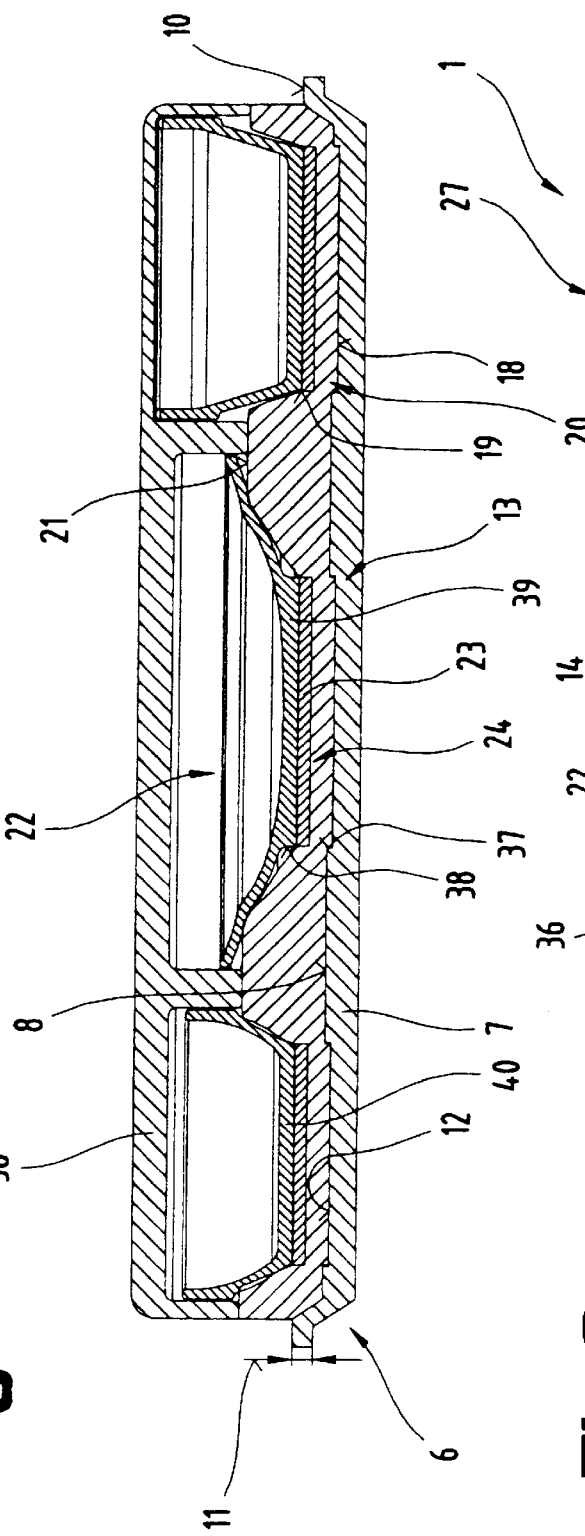
FIG. 2 is a sectional illustration of the serving and transport receptacle according to the invention along lines II—II of FIG. 1.
Figure 3:
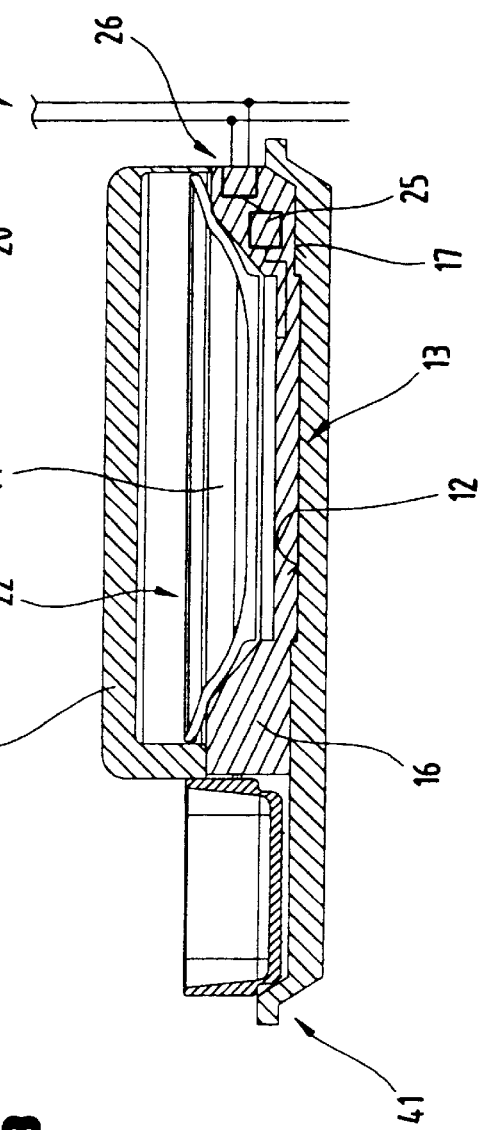
FIG. 3 is a sectional illustration of the serving and transport receptacle along lines III—III of FIG. 1.

FIGS. 1 to 3 depict a serving and transport receptacle 1 adapted to hold different food dishes 2. The serving and transport receptable 1 is comprised of a tray 3, which is designed to be tub-shaped and preferably made of a synthetic molding part and preferably of a rectangular shape having a length 4 and a width 5 measured perpendicular thereto, which amounts to about two thirds of the length 4. In order to obtain the shape of a tub, a peripheral edge formation 6 is raised relative to a bottom part 7 or an inner surface 8 while forming an obtuse angle and terminates in a border ledge 9 extending parallel with the surface 8. Between an upper side 10 of the border ledge 9 and the surface 8 is, thus, formed a depth 11, whereby it is ensured that food possibly spilled from the food dish 2 will be retained in the tray 3.

In the surface 8 of the tray 3, positioning seats 13 preferably formed by depressions 12 are arranged in certain regions to hold the food dishes 2 in a correct and safe position. Moreover, such positioning seats 13 serve to slip-safely receive and detachably retain a base part 16 made, for instance, of a heat-insulating synthetic material, which may be equipped with additional food dishes, e.g., a plate 14, a bowl 15, adapted, in particular, to receive meals to be heated or kept warm. An accommodation surface 17 of the base part 16, that faces the surfaces 8 of the tray 3 is provided with positioning means 18 that cooperate with the positioning seats 13, engaging in the positioning seats 13.

The positioning seats 13 and positioning means 18 may preferably be provided with elastically deformable edge formations 19, thus forming connection means 20 by which the base part 16 is detachably fixed to the tray 3.

It goes without saying that other types of latch members may be used as well, the formations advantageously being formed in one piece with the tray 3 and/or the base part 16.

The base part 16 includes recesses 22 departing from the surface 21 and provided to safely hold the food dishes 2, in particular plate 14 and bowl 15, means 23 for heating the food dishes 2 being provided within the recesses 22. The means 23 for keeping warm or heating the food dishes 2, or rather the meals contained therein, may be constituted by conventional means known from the prior art, such as, e.g., electrically operated heating plates. Another warming or heating solution also known from the prior art results from the use of a special food dish 2 which comprises a strip-shaped or planar heating element in its bottom surface, e.g., below a glazing layer, electrically operated contact arrangements being provided in the recess 22 of the base part 16 for supplying the heating element.

Such warming and heating means 24 are, of course, equipped, and line-connected, with an adjustment and control means 25 and an interface 26 adapted to receive electric energy from an external energy source 27. The interface 26 of the base part 16 may face the tray 3 and designed to be couplable with a contact element arranged on the same.

The base part 16, in the embodiment illustrated, is encompassed in the region of a long side edge 28 and a transverse side edge 29 extending at a right angle to the former, between the border ledge 9 extending in the sense of length 4 and the border ledge 9 extending at a right angle thereto. A limiting line 31 of the base part 16, which defines a width 30 opposite the long side edges 28, is in the form of a circular arc with a circular arc center 32 being located on a central axis 33 bisecting the length 4 and a radius 34 being larger than the maximum width 30 of the base part part 16. The width 30 is smaller than the width 5 of the tray 3, thus leaving on the tray 3 a free surface region 35 for additional food dishes 2 containing meals that need not be heated or kept warm. Additional recesses 22 adapted to the food dishes 2 naturally are arranged in the surface 8, in the surface region 35, thus providing a safe and slip-free place of deposit.

As is further apparent from the Figures, the base part 16 is covered by a hood-shaped cover part 36 preferably also made of a heat-insulating material, so that meals may be kept warm over an extended period of time and an efficient energy input is ensured as meals are being heated.

The depressions 12 provided in the surface 8 of the tray 3 as positioning seats 13, in which the base part 16 engages by its positioning means 18 that rise above the accommodation surface 17, are congruent with the base surfaces of the recesses 22 provided in the base part 16. This enables the food dishes 2 to be placed directly on the tray 3 even without using the base part 16, and keep them correctly positioned in the positioning seats 13 while preventing slipping. This is further enhanced in that the contour shape 37 of the depression 12 corresponds with the contour shape 38 of a positioning nose 39 provided in the region of the bottom 40 of the food dish 2.

Such a configuration of the serving and transport receptacle 1 enables multi-purpose applications and a plurality of combinations for supplying, heating, keeping warm and serving and, of course, transporting foods. The edge formations 6 of the tray 3 in the form of border ledges 9 at least in the region of the long side edges 28 advantageously are designed as longitudinally extending guide ledges 41, thus enabling the serving and transport receptacle 1 to be safely received and held in a rack, rack cart, etc., used to transport a plurality of such serving and transport receptacles 1.

Figure 4:
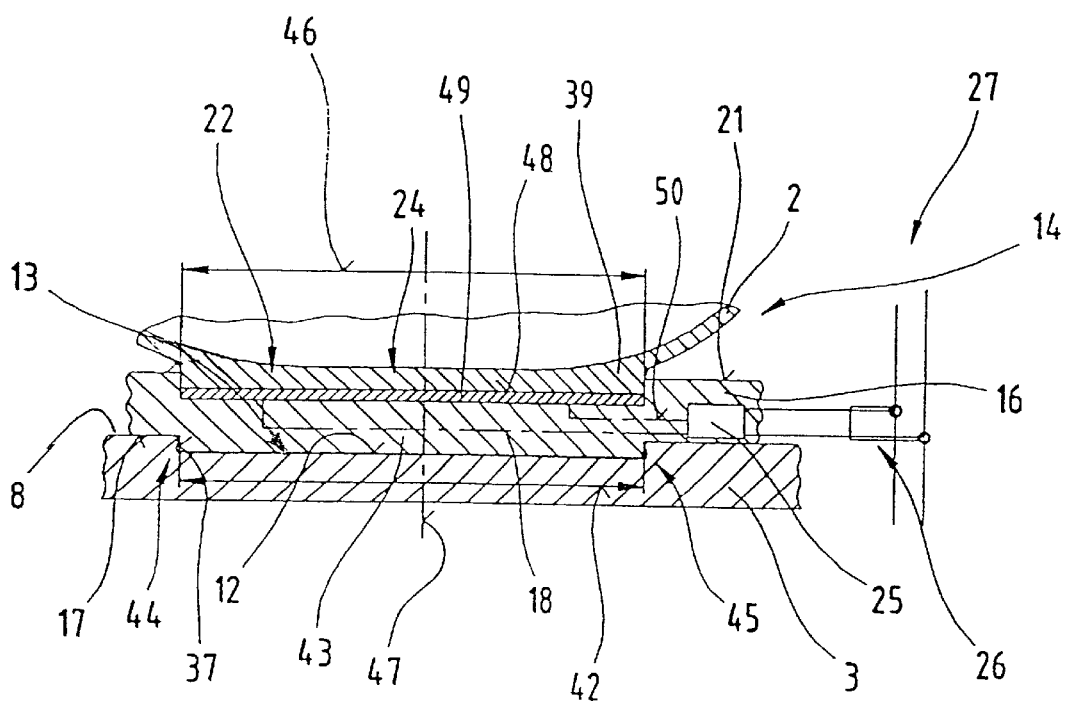
FIG. 4 is a detailed sectional view of the serving and transport receptacle according to the invention.

FIG. 4 is a detailed sectional view showing the synchronization in the arrangement and allocation of the positioning seat 13 with the positioning means 18 and the recess 22. In the surface 8 of the tray 3 is provided the depression 12 constituting the positioning seat 13 and having, for instance, a circular contour shape 37 with a diameter 42. The accommodation surface 17 of the base part 16, that faces the surface 8 comprises a projecting disc-shaped positioning nose 43 forming the positioning means 18 and adapted to the contour shape 37. Peripheral lateral surfaces 44 of the depression 12 and the positioning nose 43 are optionally provided with elastically deformable mutually engaging rims 45 for the detachable connection between base part 16 and tray 3. Thus, a connection means easy to detach and ensuring a safe retention is provided between the base part 16 and the tray 3. In the surface 21 of the base part 16 is provided the recess 22 for the positioned reception of the positioning nose 39 of the food dish 2, e.g., plate 14, which recess likewise is designed to be circular, having a diameter 46 that corresponds with the diameter 42 of the positioning seat 13 provided in the tray 3. In respect to a central axis 47 extending perpendicular to the surface 8, the recess 22 and the positioning seat 13 are arranged concentric with each other and, with regard to the contour shapes 37, 38, they are designed to be congruent. It is, thus, feasible in a very simple manner to safely transport, and safely serve, meals in the food dishes 2 by means of the tray 3 without using the base part 16, since the food dishes 2 with the respective positioning nose 39 are held in the correct position in a slip-safe manner within the positioning seat 13 of the tray 3. It should also be noted that the recess 22 may, of course, have any other geometric shape tuned to the food dish 2 used. Accordingly, also the positioning means 18 of the base part 16 and the positioning seat 13 provided in the surface 8 of the tray 3 will be adapted to that geometry.

As is, furthermore, apparent from FIG. 4, the heating means 24 as a plate-shaped heating element 49 is arranged in the recess 22 while forming an accommodation surface 48 for the food dish 2, e.g., plate 14, and during the supply and transport of the meals is line-connected with the external energy source 27 via lines 50, optionally upon interposition of the adjustment and control means 25, and via the interface 26 in order to be fed with electric energy.

For the sake of good order, it is finally pointed out that, for a better understanding of the structure of the serving and transport receptacle 1, the latter and its components are partially represented out of scale and/or on an enlarged scale and/or on a reduced scale.

The objective underlying the individual inventive solutions may be taken from the description.

In particular may the individual configurations illustrated in FIGS. 1, 2, 3, 4 constitute the subject matters of independent solutions according to the invention. The respective objectives and solutions according to the invention are apparent from the detailed descriptions of these Figures.

What is claimed is:

1. In a serving and transport receptacle arrangement for use with a food dish means filled with a portioned meal and of the type including a tray having a tray longitudinal rim and a tray surface, a base part contained in said tray and made to be heat-insulating, which base part has an accommodation surface, a recess means adapted to hold said food dish means, a heating means for heating said food dish means and an interface for feeding electric energy from an external energy source, at least one hood-shaped cover part made to be heat-insulating and adapted to be positioned and coupled with said base part, at least one positioning seat means provided in said tray surface, and at least one positioning means provided in said accommodation surface in a manner rising above said accommodation surface, said positioning means and said positioning seat means being in mutual engagement, the improvement wherein said base part is designed to hold a plurality of food dish means for hot meals and extends along said tray longitudinal rim on at least one long side in the assembled state and comprises a wall part rising from said tray, said interface for feeding electric energy being arranged in the region of said wall part.

2. A serving and transport receptacle arrangement as set forth in claim 1, wherein said positioning means is formed by at least one positioning nose rising above said accommodation surface of said base part and formed in one piece with said base part.

3. A serving and transport receptacle arrangement as set forth in claim 1, wherein said tray has an accommodation surface facing tray surface and said positioning seat means is formed by a depression provided in said accommodation surface facing tray surface, said depression having a contour shape designed to correspond with an enveloping circle of said positioning means.

4. A serving and transport receptacle arrangement as set forth in claim 2, wherein each of said plurality of food dish means has a food dish positioning nose and said base part has a base part surface including said recess means, said positioning nose rising above said accommodation surface of said basse part being arranged in a manner congruent with said recess means and said recess means being adapted to receive said food dish positioning nose.

5. A serving and transport receptacle arrangement as set forth in claim 4, wherein said base part surface comprises a plurality of recess means distributed over said tray surface to hold said plurality of food dish means, a positioning nose rising above said accommodation surface of said base part is each arranged in a manner congruent with each of said plurality of recess means and a positioning seat means formed by a depression in said tray surface is each allocated to a positioning nose.

6. A serving and transport receptacle arrangement as set forth in claim 5, wherein said plurality of recess means distributed over said tray surface have different sizes and geometric shapes to hold said plurality of food dish means having accordingly different sizes and geometric shapes.

7. A serving and transport receptacle arrangement as set forth in claim 1, wherein said tray is designed to be tub-shaped and said base part and said tray are alignedly connected with each other approximately in a long side edge region.

8. A serving and transport receptacle arrangement as set forth in claim 1, wherein said tray has a tray length and said base part has a base part length, said tray length approximately corresponding to said base part length.

9. A serving and transport receptacle arrangement as set forth in claim 1, wherein said base part has a base part long side edge and said tray has a tray width and said base part has a base part width, said tray width, measured in a direction perpendicular to said long side edge, being larger than said base part width measured in same direction.

10. A serving and transport receptacle arrangement as set forth in claim 9, wherein a limiting line opposite said base part long side edge has approximately the form of a circular arc with its center being located on a central axis bisecting said tray in terms of length and its radius being larger than the maximum width of said base part.

11. A serving and transport receptacle arrangement as set forth in claim 1, further comprising additional recess means for food dish means provided in said tray surface in its surface region rising above said base part.

12. A serving and transport receptacle arrangement as set forth in claim 1, wherein said positioning means and said positioning seat means of said base part and of said tray, respectively, are each comprised of latch means respectively formed in one piece with said tray and said base part and constituting connection means.

13. A serving and transport receptacle arrangement as set forth in claim 1, further comprising an adjustment and control means line-connected with said interface for feeding electric energy from an external energy source.

14. A serving and transport receptacle arrangement as set forth in claim 13, wherein said adjustment and control means is arranged in said base part.

15. A serving and transport receptacle arrangement as set forth in claim 1, wherein at least one of said tray and said base part and said cover part is made of a heat-insulating synthetic material.

16. A serving and transport receptacle arrangement as set forth in claim 1, wherein at least one of said base part and said cover-part is made of a heat-insulatingly coated metal.

* * * * *